April 23, 1935.  J. P. BYRAN  1,998,655
EMERGENCY ELECTRIC GENERATING SET
Original Filed July 3, 1930   3 Sheets-Sheet 1

FIG. 1   J. P. Bryan INVENTOR
BY
Thomas Howe ATTORNEY

April 23, 1935.  J. P. BYRAN  1,998,655
EMERGENCY ELECTRIC GENERATING SET
Original Filed July 3, 1930   3 Sheets—Sheet 2

April 23, 1935.  J. P. BYRAN  1,998,655
EMERGENCY ELECTRIC GENERATING SET
Original Filed July 3, 1930   3 Sheets-Sheet 3

INVENTOR
J. P. Bryan
BY Thomas Howe
ATTORNEY

Patented Apr. 23, 1935

1,998,655

UNITED STATES PATENT OFFICE 1,998,655

EMERGENCY ELECTRIC GENERATING SET

Joseph P. Bryan, Troy, Pa.

Application July 3, 1930, Serial No. 465,624
Renewed August 21, 1934

8 Claims. (Cl. 290—30)

This invention relates to emergency electric generating sets.

In many instances it is desirable, and even necessary, that an auxiliary or emergency electric generating set be in readiness to supply current when the main source of electricity fails for any reason. As an instance of this, the lights in moving picture theatres and other places of public gathering are usually lighted from the supply mains for the city, which mains are usually laid along the streets and receive their electricity from a central generating station. If such a source of supply of electricity to the theatre or other place of public gathering, is discontinued because of failure at the central station, or disconnection or failure of the supply lines, the place of gathering would be left in darkness. In case of fire the supply lines are apt to be disconnected by the ravages of the fire or by the action of the firemen. In some localities it is a rule that the first duty of the firemen on reaching a fire is to disconnect all connection of the fired building with the electric supply mains. This, of course, extinguishes all the electric lights in the building including the exit lights, and in time of fire the people left in darkness, not knowing which way to turn, are likely to become involved in a panic with consequent disaster. Many actual occurrences have taken place wherein large numbers of people have been seriously injured and even killed because of failure of the lights in time of fire.

It has been proposed to provide an emergency generating set to supply electricity in place of the regular source, and on account of the fact that substantially all buildings are provided with water mains under pressure so that a source of power is thus supplied in substantially all instances, it has been proposed to utilize the usual water mains in a building as a source of power for driving an emergency electric generator set to supply electricity when the main source of supply fails. Such sets have been quite extensively used in practice and have given satisfactory service at least to the extent of supplying the exit lights with current so that panic conditions, as referred to, have been avoided. The capacity of such sets has, however, been limited by the practical considerations that the municipality or the private water company supplying the water usually requires a rather heavy service charge to be paid where they stand ready to supply an unusually large amount of water, even though the water is not actually used, and the water service pipes from the street which supply the building, are usually insufficient to supply an adequate amount of water for developing large amounts of power, so that to provide an adequate supply it would be necessary to dig up and relay the water service pipes from the street mains, and in some instances the total amount of water supplied to a building is limited to an amount inadequate to supply power to a generating set of large capacity.

It is the main object of the present invention to provide a reliable emergency electric generating set which shall not be limited in capacity.

It is a further object of the invention to utilize one source of power for initiating the operation of the set and another source for continuing the operation of the set under load. For instance, the set may comprise a gas or gasolene engine driving an electric generator. Such engine is not self-starting, however, but requires to be "cranked". To supply the cranking power the water of the building supply mains may be utilized. It will be seen under these conditions that the main power of the emergency set is independent of the starting power (the water pressure). The water pressure only supplies the starting force and the capacity of the set for carrying the load, after it has been started, is independent of the water supply which is only used to "crank" the engine. It will be seen that in this way the demands upon the water mains are not excessive and objections in relation to large demands upon that source of supply, as above referred to, are obviated; and this consistently with the supplying of any power, however great, by the set.

Of course other sources of "cranking" power than water pressure, and other prime movers than the engine mentioned, might be employed.

A further object of the invention is to provide a set wherein the prime mover for driving the set is an internal combustion engine (gas, gasolene or oil) and the engine is started by suitable means actuated from a source of power.

A further object is to provide a set wherein the prime mover for the set, being an internal combustion engine, the engine is started by fluid-pressure-operated means.

A further object of the invention is to provide a set wherein the prime mover, being an internal combustion engine, is started by water motivated means.

Further objects of the invention are to provide controlling means whereby the desired results are brought about.

Other and ancillary objects of the invention will appear hereinafter.

In the accompanying drawings which illustrate the invention:

Figure 1:
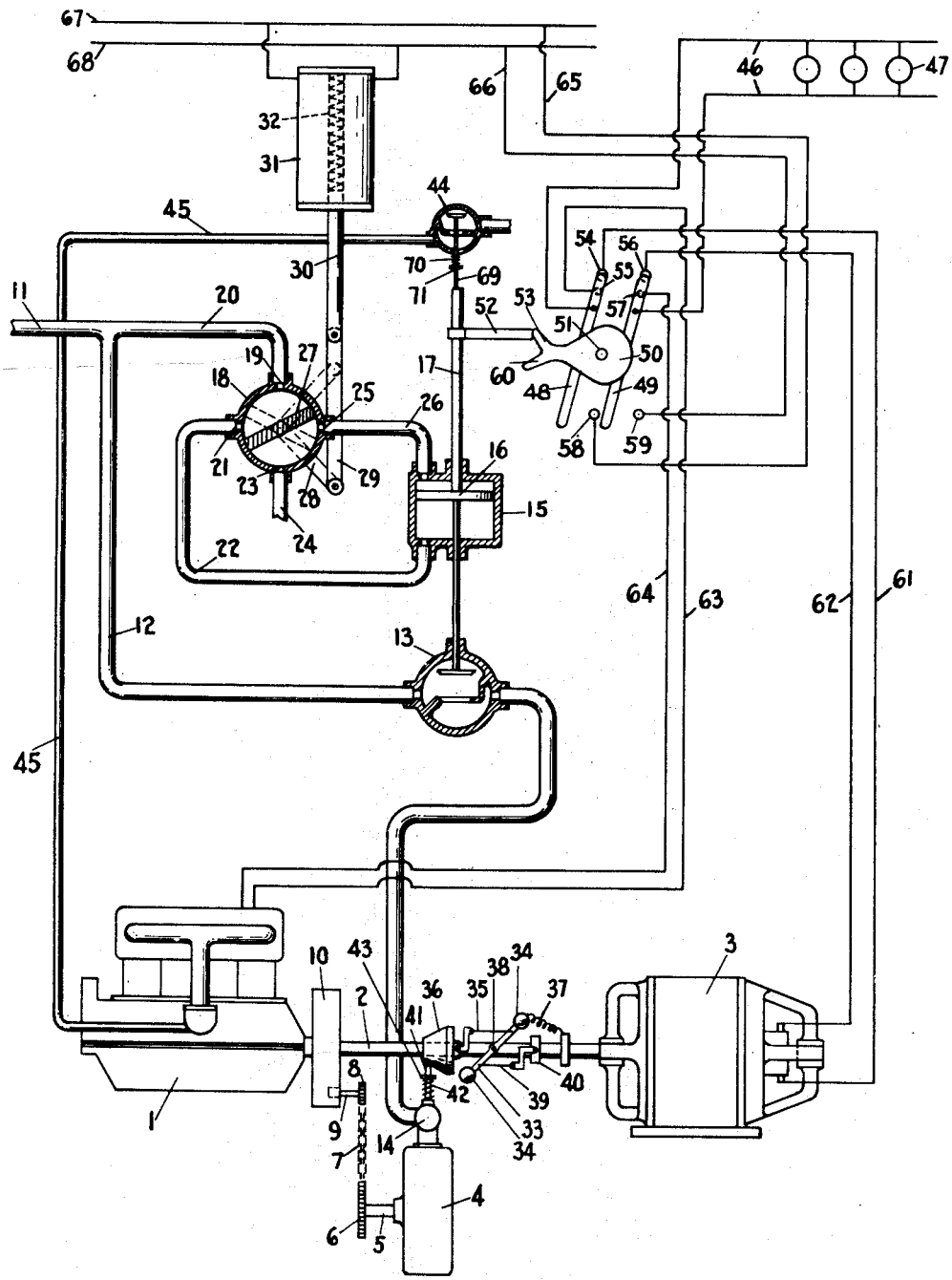
Fig. 1 is a diagrammatic view setting forth apparatus embodying the invention.
Figure 2:
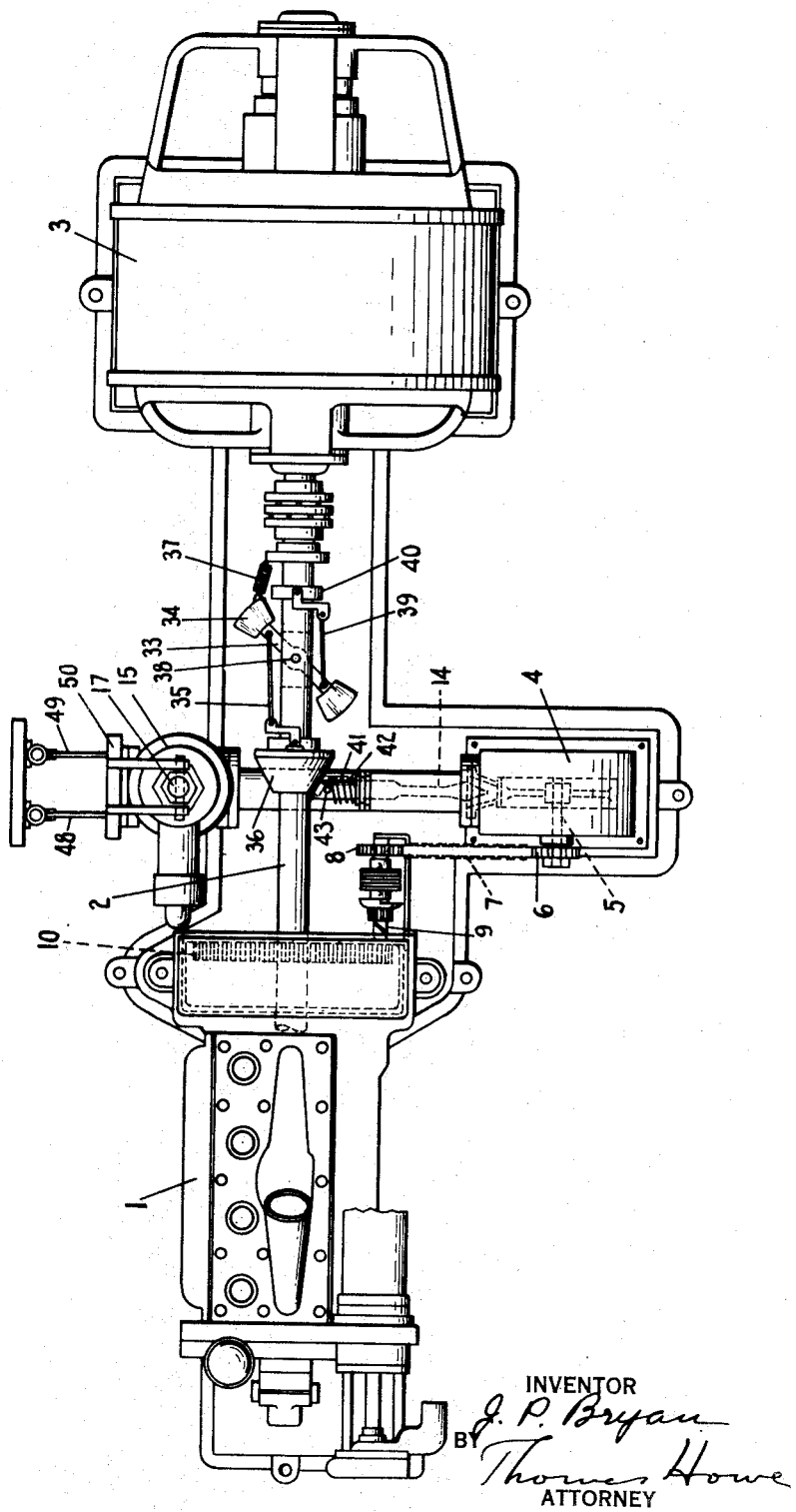
Fig. 2 is a top plan view of a set showing the arrangement of an internal combustion engine, a starting water wheel therefor and an electric generator driven by the engine with certain of the controlling parts, certain other of the parts being omitted.
Figure 3:
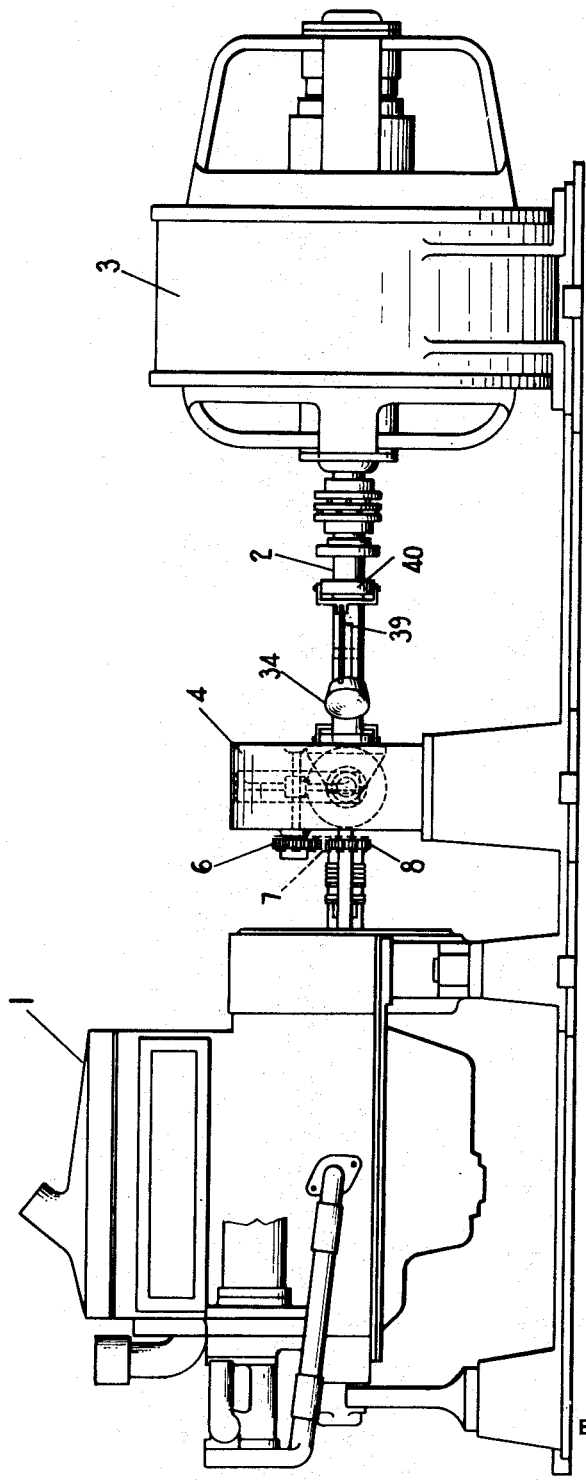
Fig. 3 is a side elevation of the apparatus of Fig. 2.

Referring to the drawings, the set comprises an internal combustion engine 1 having a shaft 2 by which it is directly connected with the rotor of a direct current electric generator 3. To start the engine a water wheel 4 is provided which may be of the impulse or any other suitable type. Mounted upon the rotating shaft 5 of the water wheel is a sprocket wheel 6 meshing with a sprocket chain 7 which also meshes with the sprocket wheel 8 fixed upon the shaft 9 of a starting drive, comprising a spur gear which is adapted to be moved into and out of mesh with the teeth of an internal gear on the inside of the fly wheel 10 of the engine 1. This driving connection is such that the spur gear is in mesh with the internal gear on the fly wheel until the engine has attained a speed such that the speed of the internal gear is greater than that of the spur gear and then the spur gear is automatically disengaged from the internal gear. Any suitable and well known driving connection for accomplishing this, of which there are many examples in the prior art, may be employed. An example of such a connection is shown in the Patent No. 1,116,370 dated November 10, 1914, Vincent Bendix. The water wheel 4 is supplied with water under pressure from the usual building supply main 11 by means of the pipe 12 controlled by the valves 13 and 14.

The valve 13 is operated by means of a hydraulic cylinder 15 within which reciprocates the piston 16 fixed on the piston rod 17 which extends out of the cylinder at both ends. The piston 16 is moved in one direction or the other by water pressure from the main 11. The water pressure in the cylinder 15 is controlled by means of a valve comprising a casing 18 having the port 19 with which the water pipe 20 from the main 11 is connected, the port 21 connecting with the pipe 22 leading to the cylinder 15 below the piston 16, the port 23 connecting with the drain pipe 24 leading to the sewer or other waste conduit, and the port 25 connecting with the pipe 26 leading to the cylinder 15 above the piston 16.

Within the casing 18 and in fluid tight relation therewith is a rotatably mounted valve member 27 to which is secured the arm 28 which is pivoted to the link 29 which in turn is pivoted to the lower end of the plunger 30 of the electromagnet 31. The plunger of the electromagnet is normally pressed downwardly by a spring 32 and when the solenoid is energized its plunger is attracted upwardly against the pressure of the spring 32. With the solenoid energized the valve 27 will be in the position as shown in dotted lines (Fig. 1). In this position of the valve the water main 11 is connected with the pipe 20 which introduces the water pressure of the main above the piston 16, causing the same to lower, any water below the piston being exhausted through the pipe 22 and the ports 21 and 23 into the drain pipe 24. Under these conditions, the piston 16 will be moved to its lowermost position. This will have the effect of closing the valve 13 which is secured to the lower end of the piston rod 17.

When the electromagnet 31 is deenergized, the spring 32 forces the plunger downwardly thereby moving the valve 27 into the position as shown in full lines (Fig. 1) when the port 19 will be in communication with the port 21 thereby connecting the water pressure of the main 11 with the cylinder 15 below the piston, and the ports 25 and 23 will be in communication thereby connecting the space in the cylinder above the piston with the drain pipe 24. The result is that the piston will move upwardly thereby opening the valve 13. When, therefore, the electromagnet 31 is energized, the valve 13 is closed thereby shutting off water supply to the water wheel 4. When, however, the solenoid 31 is deenergized the valve 13 is opened and the water supply is connected (the valve 14 being open) with the water wheel which starts into rotation and cranks the engine 1.

The valve 14 is controlled by a centrifugal governor comprising the arm 33 having centrifugal weights 34 at its ends. This bar 33 has pivoted to it a link 35 which is also pivoted to the cone-shaped cam 36 sliding on the shaft 2. A spring 37 tends to hold the arm 33 and the weights 34 in retracted position. Upon the opposite side of the pivotal center 38 of the bar 33 from the link 35 is a link 39 pivoted to the bar 33 and also to a collar 40 which slides upon the shaft 2, the link 39 being pivoted to the bar 33 and to the collar 40. The object of this latter connection with the bar 33 is to balance the bar 33. When the set, and consequently the shaft 2, is at rest, the spring 37 will retract the weighted centrifugal governor bar 33 and the conical cam 36 will be held in its right hand position so that the stem 41 of the valve 14 may be moved upwardly by the spring 42 inserted between the body of the valve and the collar 43 fixed upon the valve stem and the valve will be open. When, therefore water is admitted from the main 11 upon the deenergization of the electromagnet 31 as hereinbefore described, the water will be admitted to the water wheel 4 which will start in rotation. The revolution of the water wheel will drive the engine 1 as before described, and the engine with its connection generator 3 will be set into rotation. The engine having started as described it will come into operation under its own power as is well understood, and it is therefore undesirable that the water should continue to be supplied to the water wheel after the set has been started and the engine is running under its own power. It is for this reason that the valve and its centrifugally controlled operating means is provided. When the engine has attained its normal speed, operating under its own power, the centrifugal force exerted by the weights 34 will cause them to fly upwardly against the tension of the spring 37 thereby pushing the cam 36 to the left (Fig. 1) thereby forcing the stem inwardly against the tension of the spring 42 and closing the valve thereby shutting off the supply of water to the water wheel 4.

The rising of the piston rod 17 consequent upon deenergization of the electromagnet 31 also causes opening of the valve 44 in the fuel line 45 through which the fuel is supplied to the engine 1 from any suitable source. It will be understood that if this engine is a gas engine, and the fuel supplied is gas, that a suitable mixing chamber for forming a combustible mixture of the gas with air will be provided, and that if the engine 1 is a gasoline engine and the fuel supplied is gasoline a suitable carbureter and other appurtenances of such an engine will be supplied. This is well understood in the art. Conversely when the solenoid 31 is energized and the piston rod 17 descends, the valve 44 will be closed shutting off the supply of fuel. The valve 44 is opened by the upper end of the piston rod 17 coming against the end of the valve stem 69 thereby raising the valve, to open it, against the pressure of the spring 70 interposed between the body of the valve and the collar 71 fixed on the valve stem. This spring operates to close the valve when relieved from the pressure of the piston rod.

The consumption circuit which comprises the conductors 46 and the lamps or other translating devices 47 has the conductors 46 connected with the copper bars 48 and 49 fixed upon the insulating block 50 which is pivoted at 51, whereby it provides a common support for the blades 48 and 49 but insulates those blades from each other. The block 50 and its carried blades are rotated upon the pivot 51 by means of a projection 52 fixed upon the piston rod 17. As the piston rod rises it engages the branch 53 of the forked end of the block 50 when the blades 48 and 49 are turned in the position as shown where the blade 48 engages the stationary contacts 54 and 55 and the blade 49 engages the stationary contacts 56 and 57, the blades being out of contact with the stationary contacts 58 and 59. When the piston 16 and its rod 17 descend the projection 52 engages the other horn 60 of the forked end of the block 50 thereby turning the block and its carried switch blades so that those blades 48 and 49 are respectively moved into contact with the stationary contacts 58 and 59, and out of contact with the stationary contacts 54, 55, 56 and 57. The terminals of the generator 3 are connected respectively by conductors 61 and 62 with the stationary contacts 54 and 56, the engine ignition conductors 63 and 64 being respectively connected with the stationary contacts 55 and 57, while the conductors 65 and 66, the same being connected with the main or city supply mains 67 and 68, are respectively connected with the stationary contacts 58 and 59. It will be seen that in the position of the switch as shown, the conductors 65 and 66 are dead ended at the stationary contacts 58 and 59, while the conductors 46 of the consumption circuit are respectively connected with the conductors 61 and 62 leading from the terminals of the generator 3 and that the ignition circuit leads 64 and 63 are connected with the generator leads 61 and 62.

When the piston 16 and its rod 17 have descended the block 50 will be turned so that the blades 48 and 49 will engage with the stationary contacts 58 and 59 thereby connecting the main line conductors 67 and 68 respectively with the conductors of the consumption circuit. Also in this position of the switch the stationary contacts 54, 55, 56 and 57 will be out of contact with the blades 48 and 49 so that the conductors 46 of the consumption circuit will be disconnected from the leads 61 and 62 from the generator 3, and also the ignition circuit 63 and 64 will be disconnected from the generator leads 61 and 62.

It will now be seen that when the electromagnet 31 is energized, which is the case whenever current is on the mains 67 and 68, that the valve operated by that solenoid will be in such position that the water main 11 will be connected with the space in the cylinder 15 above the piston 16 and that piston with its rod will be forced to its lower position. This operates to close the valve 13 which cuts off all supply of water from the main 11 to the water wheel 4. This also permits the valve 44 to be closed under the action of the spring 70 which shuts off the supply of fuel from the engine 1. The engine, water wheel and generator will therefore be at rest. Also in this position of the piston 16 the switch including the block 50 and blades 48 and 49 will be in such position that the conductors 46 of the consumption circuit will be connected through the blades 48 and 49, the stationary contacts 58 and 59 and the conductors 65 and 66 respectively with the main or city supply mains 67 and 68. The lamps, or other translating devices, 47 will thus be supplied with current from the mains 67 and 68 and the emergency set will be at rest.

If now the current supply on the mains 67 and 68 fails for any cause, the electromagnet 31 will be deenergized when the valve member 27 will be turned in the position as shown in full lines in Fig. 1. This operates to connect the water main 11 with the cylinder 15 beneath the piston while the space above the piston is connected with the drain 24. The piston therefore rises whereby the valve 13 is opened permitting water from the main 11 to the water wheel 4 and the fuel supply valve 44 for the engine is also open. Also the switch comprising the insulating block 50 and blades 48 and 49 will be shifted into the position as shown in full lines in Fig. 1 thereby disconnecting the consumption circuit including the lights 47, from the supply mains 67 and 68 and connecting the conductors of the consumption circuit with the terminals of the generator 3. Also the terminals of the generator 3 will be connected to the conductors 63 and 64 of the ignition circuit for the engine. Of course the usual appurtenances of the ignition circuit of an engine as described, such as spark coils, spark plugs, distributor etc., as is well understood, will be provided.

The cone-cam 36 will be retracted into the position to permit the valve 14 to be open. Under the conditions as above mentioned the water wheel 4 will start into rotation and will rotate or "crank" the engine 1. As the speed increases the cone 36 will be shifted so as to close the valve 14 and thereby cut off the water supply from the water wheel. The driving connection between the water wheel and the engine will be automatically disconnected as above explained, and the engine, having been started, will continue its operation under its own power. The consumption circuit will be disconnected from the main lines 67 and 68 and be connected with the terminals of the generator which will supply power to the translating devices in the consumption circuit. This condition will continue, the emergency set supplying current for the consumption circuit so long as current is cut off from the main circuit, and it is to be observed that the amount of current supplied by the emergency generator set may be any that is desired and independent of the capacity or allowable use of the water supply, because such supply is only necessary to start the engine, after starting the engine being operated under its own power which is independent of the water supply.

The emergency set will operate under the conditions as described to supply power to the consumption circuit so long as there is no power upon the lines 67 and 68. If, however, power should be restored to the lines 67 and 68 the plunger 30 of the electromagnet will be lifted and the member 27 moved in the position as indicated in dotted lines in Fig. 1. This will introduce water pressure from the main 11 above the piston 16 and exhaust the liquid from below the piston 16. The piston will consequently move downwardly, thereby closing the valve 44 and shutting off the fuel supply from the engine and closing the water valve 13. Also the switch comprising the block 50 and blades 48 and 49 will be shifted thereby disconnecting the engine ignition means 63 and 64 from the generator 3 and also disconnecting the conductors of the consumption circuit from that generator. The mains 67 and 68 will be connected with the conductors of the consumption circuit. Under these conditions the consumption circuit will receive its current from the main conductors 67 and 68 and the engine and set will come to rest. The coming to rest of the set will cause the valve 14 to open, but the valve 13 is closed cutting off the water supply. The valve 14 being open, the set is ready to be again started upon the opening of the valve 13.

While the invention has been illustrated in what is considered its best application it may have other embodiments without departing from its spirit and is not therefore limited to the structures shown in the drawings.

What I claim is:

1. The combination with an electrical supply circuit, of an electrical consumption circuit, an electric generator, an internal combustion engine adapted to drive said generator, a water motor adapted to drive said engine, a source of water supply for said motor existing independently of said engine, a valve controlling communication of said water supply with said motor, electro-magnetic means responsive to voltage in said supply circuit and controlling said valve to control the admission of water to said motor and means responsive to voltage in said supply circuit for alternately connecting said consumption circuit with said supply circuit and with said generator, and means responsive to the speed of the engine for controlling the supply of water to said motor.

2. The combination with an electrical supply circuit, of an electrical consumption circuit, an electric generator, an internal combustion engine adapted to drive said generator, a water motor adapted to drive said engine, a source of water supply for said motor existing independently of said engine, a valve controlling communication of said water supply with said motor, electro-magnetic means responsive to voltage in said supply circuit and controlling said valve to control the admission of water to said motor and means responsive to voltage in said supply circuit for alternately connecting said consumption circuit with said supply circuit and with said generator, and means responsive to the speed of the engine for controlling the supply of water to said motor and speed controlled driving connections between said motor and engine responsive to the engine speed.

3. The combination with an electrical supply circuit, of an electrical consumption circuit, an electric generator, an internal combustion engine adapted to drive said generator, a water motor adapted to drive said engine, a source of water supply for said motor, a valve controlling communication of said water supply with said motor, electro-magnetic means responsive to voltage in said supply circuit and controlling said valve to control the admission of water to said motor and means responsive to voltage in said supply circuit for alternately connecting said consumption circuit with said supply circuit and with said generator, and means responsive to the speed of the engine for controlling the supply of water to said motor.

4. The combination with an electrical supply circuit, of an electrical consumption circuit, an electric generator, an internal combustion engine adapted to drive said generator, a water motor adapted to drive said engine, a source of water supply for said motor, a valve controlling communication of said water supply with said motor, electro-magnetic means responsive to voltage in said supply circuit and controlling said valve to control the admission of water to said motor and means responsive to voltage in said supply circuit for alternately connecting said consumption circuit with said supply circuit and with said generator, and means responsive to the speed of the engine for controlling the supply of water to said motor and speed controlled driving connections between said motor and engine responsive to the engine speed.

5. The combination with an electrical supply circuit, of an electrical consumption circuit, an electric generator, an internal combustion engine adapted to drive said generator, a water motor adapted to drive said engine, a source of water supply for said motor, a valve controlling communication of said water supply with said motor, electro-magnetic means responsive to voltage in said supply circuit and controlling said valve to control the admission of water to said motor and means responsive to voltage in said supply circuit for alternately connecting said consumption circuit with said supply circuit and with said generator, and means responsive to the speed of the engine for controlling the driving connections between said motor and engine.

6. The combination with an electrical supply circuit, of an electrical consumption circuit, an electric generator, an internal combustion engine comprising ignition means and adapted to drive said generator, a water motor adapted to drive said engine, a source of water supply for said motor, a valve controlling communication of said water supply with said motor, electro-magnetic means responsive to voltage in said supply circuit and controlling said valve to control the admission of water to said motor and means responsive to voltage in said supply circuit for alternately connecting said consumption circuit with said supply circuit and with said generator, and means responsive to voltage in said supply circuit for controlling the said ignition means.

7. The combination with an electrical supply circuit, of an electrical consumption circuit, an electric generator, an internal combustion engine adapted to drive said generator, a water motor adapted to drive said engine, a source of water supply for said motor, a valve controlling communication of said water supply with said motor, electro-magnetic means responsive to voltage in said supply circuit and controlling said valve to control the admission of water to said motor and means responsive to voltage in said supply circuit for alternately connecting said consumption circuit with said supply circuit and with said generator and means responsive to voltage in said supply circuit for controlling the fuel supplied to the engine.

8. The combination with an electrical supply circuit, of an electrical consumption circuit, an electric generator, an internal combustion engine comprising ignition means and adapted to drive said generator, a water motor adapted to drive said engine, a source of water supply for said motor, a valve controlling communication of said water supply with said motor, electro-magnetic means responsive to voltage in said supply circuit and controlling said valve to control the admission of water to said motor and means responsive to voltage in said supply circuit for alternately connecting said consumption circuit with said supply circuit and with said generator and means responsive to voltage in said supply circuit for establishing circuit connections of said ignition means with said dynamo.

JOSEPH P. BRYAN.